United States Patent
Sathe

(10) Patent No.: US 10,242,419 B2
(45) Date of Patent: Mar. 26, 2019

(54) COMPILER OPTIMIZATION TO REDUCE THE CONTROL FLOW DIVERGENCE

(71) Applicant: INTEL CORPORATION, Santa Clara, CA (US)

(72) Inventor: Rahul P. Sathe, Emeryville, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/843,698

(22) Filed: Sep. 2, 2015

(65) Prior Publication Data

US 2017/0061569 A1    Mar. 2, 2017

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ......... G06T 15/005; G06T 1/20; G06T 15/04; G06T 5/00; G06T 1/60; G06T 7/00; G06T 15/80; G06T 15/20; G06T 15/60; G06T 3/20; G09G 5/363; G06F 9/3851; G06F 9/30; G06F 15/00; G06F 9/312; G06F 9/45; G06F 7/38; G06F 9/3867; G06F 8/456; G06F 9/38; G06F 12/0875; G06F 2009/45583; G06F 2212/302; G06F 3/0673; G06F 19/00; G06F 19/18; G06F 9/3887; G06Q 10/06311; G06Q 10/0633; G06Q 10/103
See application file for complete search history.

(56) References Cited

U.S. PATENT DOCUMENTS

| 7,353,369 | B1 | 4/2008 | Coon et al. |
| 7,477,255 | B1 | 1/2009 | Lindholm et al. |
| 9,390,539 | B2 | 7/2016 | Akenine-Moller et al. |
| 2007/0220525 | A1* | 9/2007 | State ..................... G06F 9/4881 718/107 |
| 2013/0042090 | A1 | 2/2013 | Krashinsky |
| 2013/0179662 | A1* | 7/2013 | Choquette ............ G06F 9/3851 712/206 |
| 2013/0219378 | A1 | 8/2013 | Glaister et al. |
| 2015/0026438 | A1* | 1/2015 | Giroux ..................... G06F 9/38 712/225 |
| 2015/0205590 | A1 | 7/2015 | Sabne et al. |

OTHER PUBLICATIONS

International Search Report and Written Opinion of the International Searching Authority for PCT/US2016/043339 dated Oct. 31, 2016, 9 pages.
PCT Application No. PCT/US2016/043339, Notification Concerning Transmittal of International Preliminary Report on Patentability, Mar. 15, 2018, 9 pgs.

* cited by examiner

*Primary Examiner* — Xilin Guo
(74) *Attorney, Agent, or Firm* — Womble Bond Dickinson (US) LLP

(57) ABSTRACT

In one embodiment a graphics processing system comprises a graphics processor having execution logic and shared memory and a shader compiler unit to compile a shader program for execution by the execution logic of the graphic processor, wherein the shader is to optimize the shader program during the compile, wherein to optimize the shader program includes to convert a divergent block of parallel instructions into a divergent block and a non-divergent block of instructions.

20 Claims, 16 Drawing Sheets

FIG. 9A GRAPHICS PROCESSOR COMMAND FORMAT
900
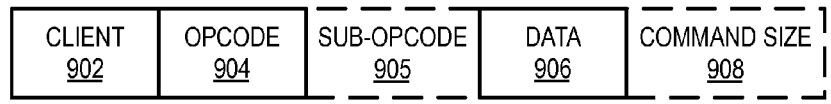
FIG. 9B GRAPHICS PROCESSOR COMMAND SEQUENCE
910
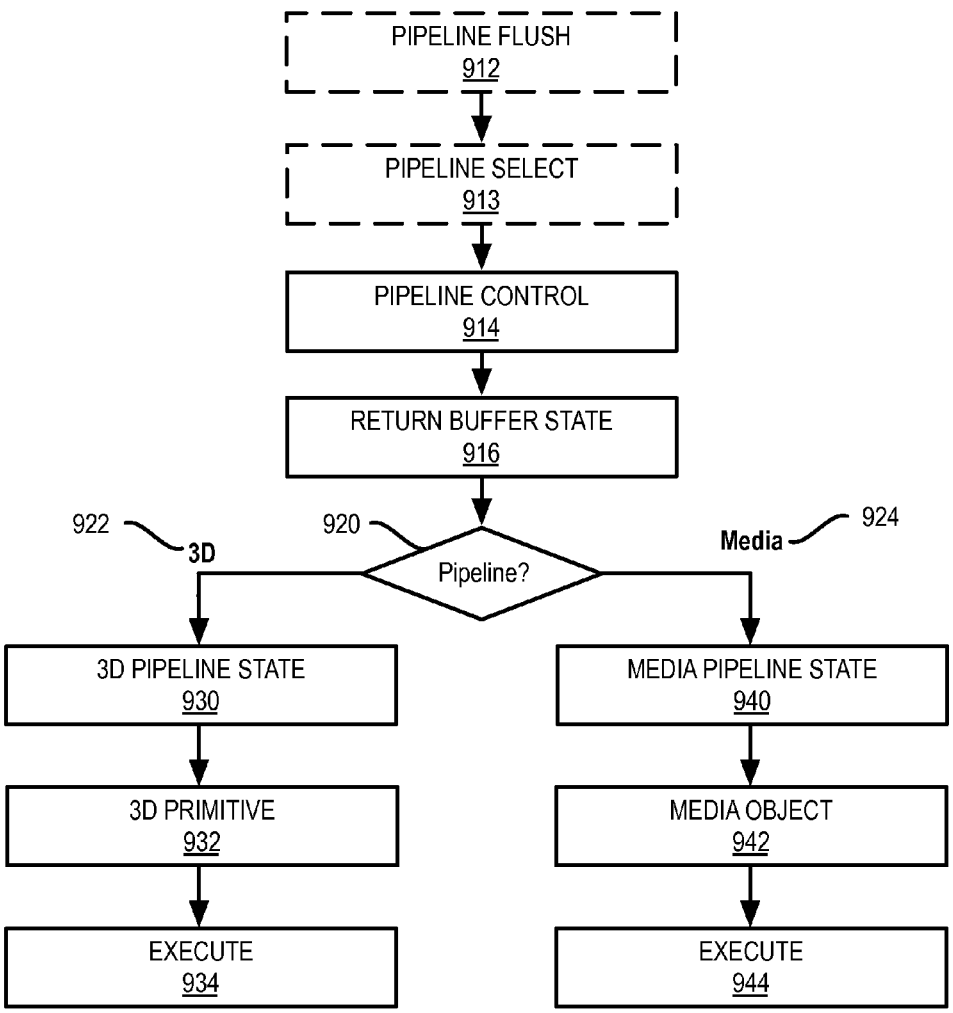

US 10,242,419 B2

COMPILER OPTIMIZATION TO REDUCE THE CONTROL FLOW DIVERGENCE

BACKGROUND

Field of the Disclosure

Embodiments are generally related to graphics processor devices, and more particularly to compiler optimizations to reduce the control flow divergence.

Description of the Related Art

Graphical output for a computer system is generally created using one or more graphics processors. Each graphics processor may include multiple graphics processor cores, and each graphics processor core may include multiple types of resources to perform various types of graphics operations. The various types of graphics operations utilize multiple types of graphics workloads, which each may use different resources within the graphics cores. For computationally intensive workloads, the graphics processor execution units are used extensively.

Graphics hardware often has an array of single instruction multiple data (SIMD) cores that process data in parallel. During operation, the SIMD cores perform a single instruction (e.g., the same operation) on multiple data items in a single SIMD batch. Performing SIMD operations result in memory bandwidth savings by amortizing the instruction fetch bandwidth across the multiple operations. SIMD operation, provided sufficient work items are available to process in parallel, contributes to the power efficiency of GPUs on certain workloads. However, SIMD processing can be less power efficient if the control flow constructs in the executed instructions are divergent.

BRIEF DESCRIPTION OF THE DRAWINGS

The following description includes discussion of figures having illustrations given by way of example of implementations of the various embodiments. The figures should be understood by way of example and not by way of limitation.

FIG. 9A is a block diagram illustrating a graphics processor command format according to an embodiment.

FIG. 9B is a block diagram illustrating a graphics processor command sequence according to an embodiment.

DETAILED DESCRIPTION

To increase the efficiency of SIMD graphics operations, embodiments described herein present a compiler optimization that makes use of shared local memory to opportunistically reduce control flow divergence by optimizing instruction control flow during compilation. In this disclosure, concepts will be described using terminology and nomenclature consistent with the Microsoft® Direct3D11+ terminology. For example, compile time optimizations for compute shaders will be described. However the concepts and techniques of the embodiments described herein are not limited to any specific application programming interface or programming language. For example, the concepts and techniques are also applicable the APIs including device side Open CL, OpenGL, or any other language or API applicable to SIMD execution.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

Although some of the following embodiments are described with reference to a processor, similar techniques and teachings can be applied to other types of circuits or semiconductor devices, as the teachings are applicable to any processor or machine that performs data manipulations.

System Overview

Figure 1:
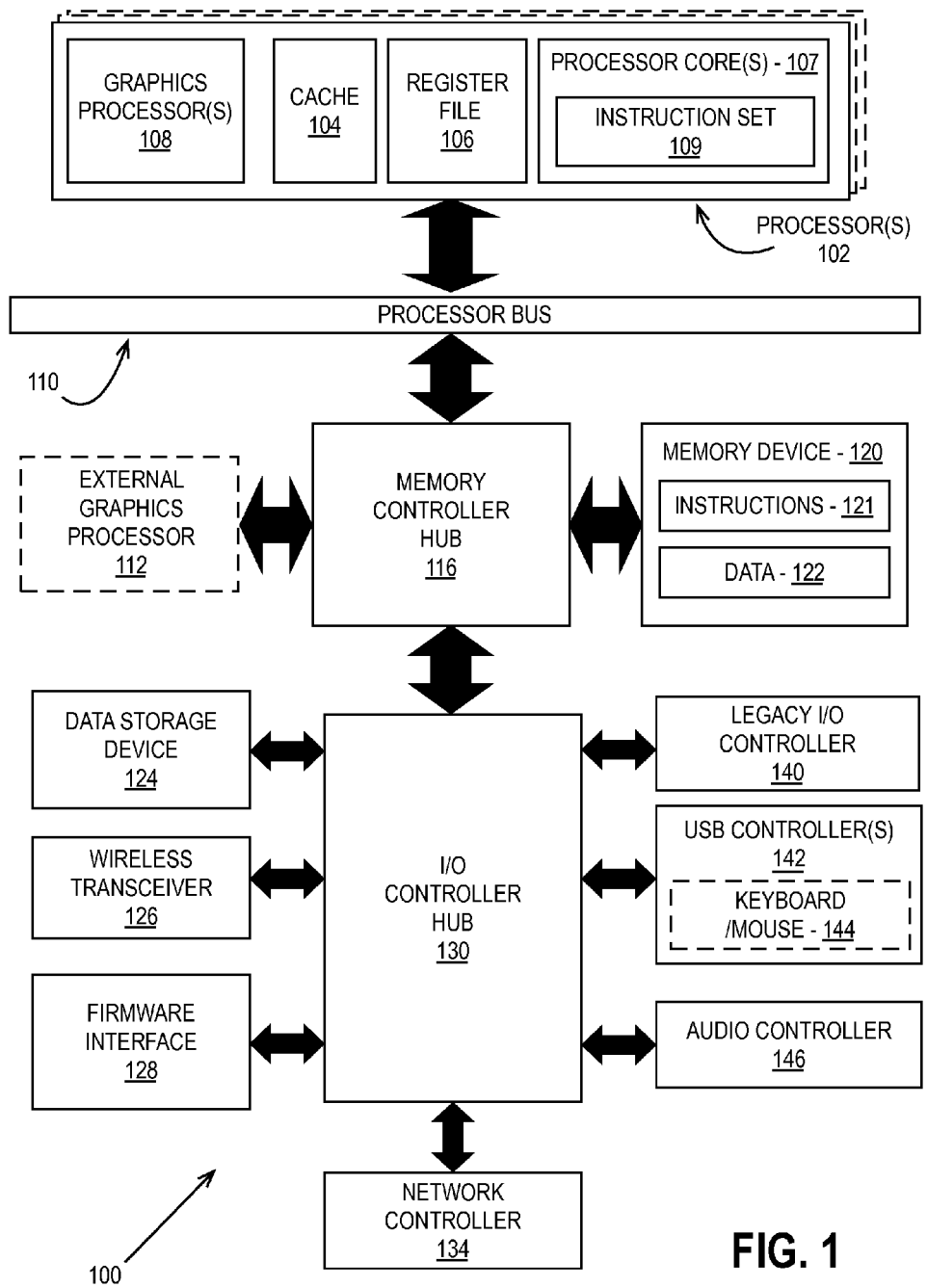
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
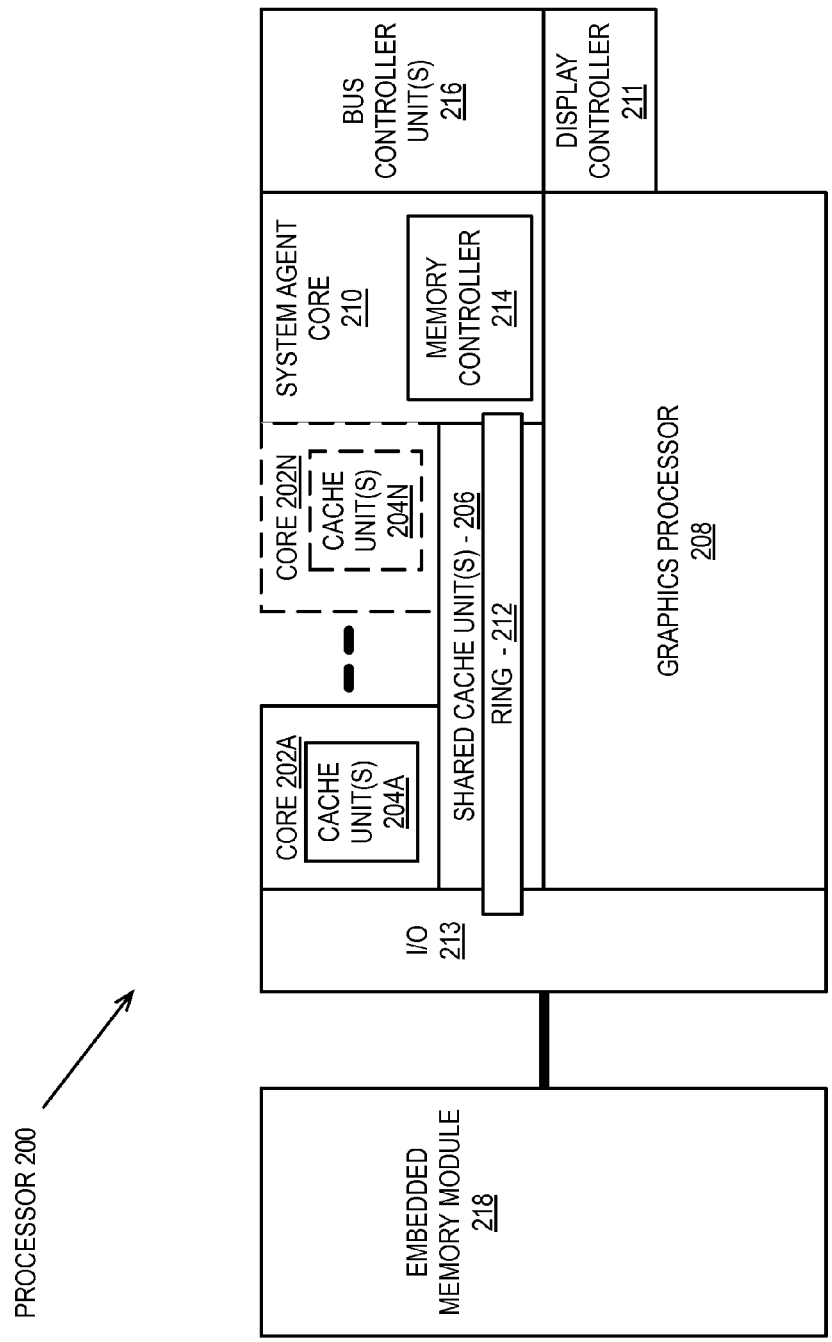
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
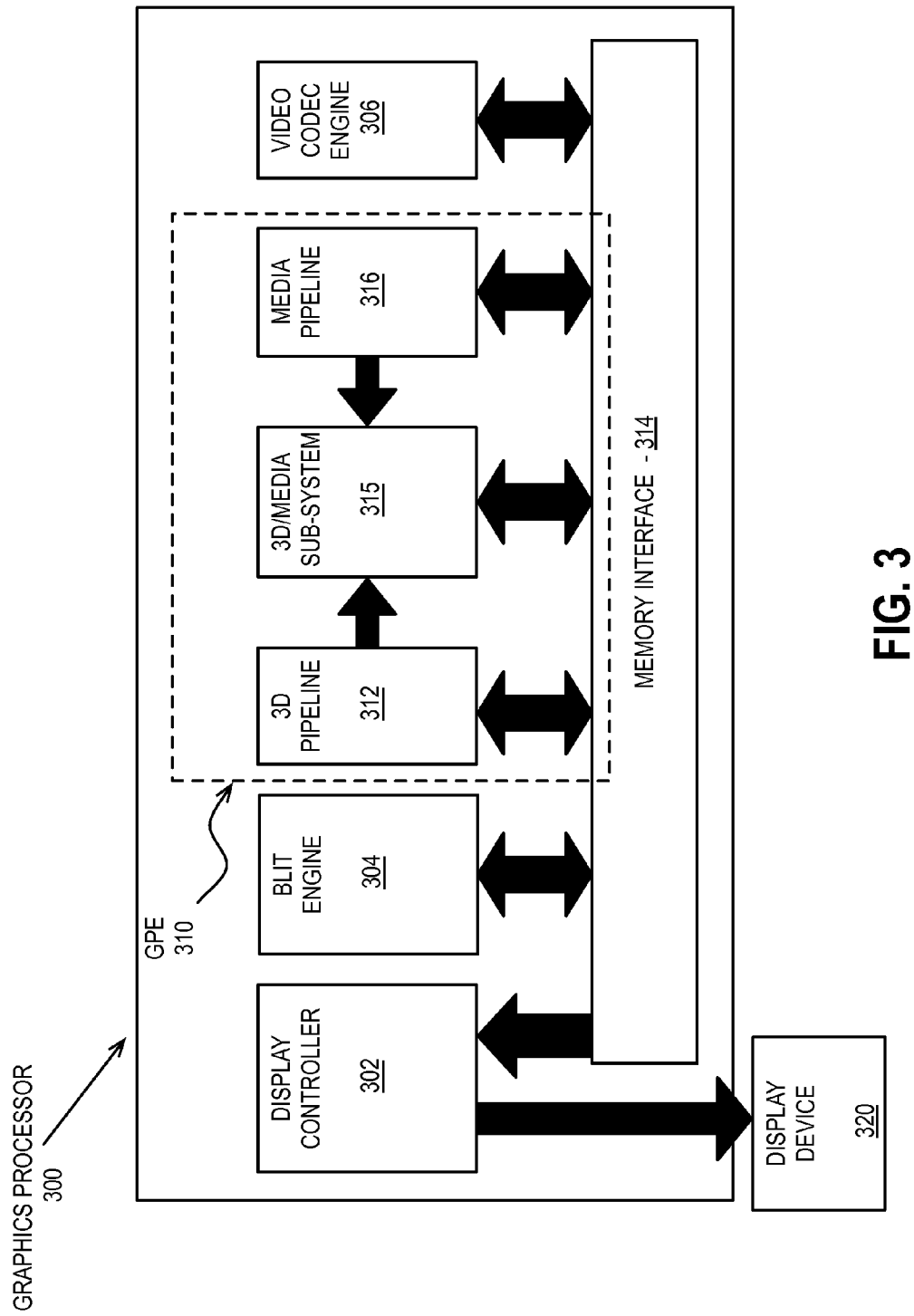
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
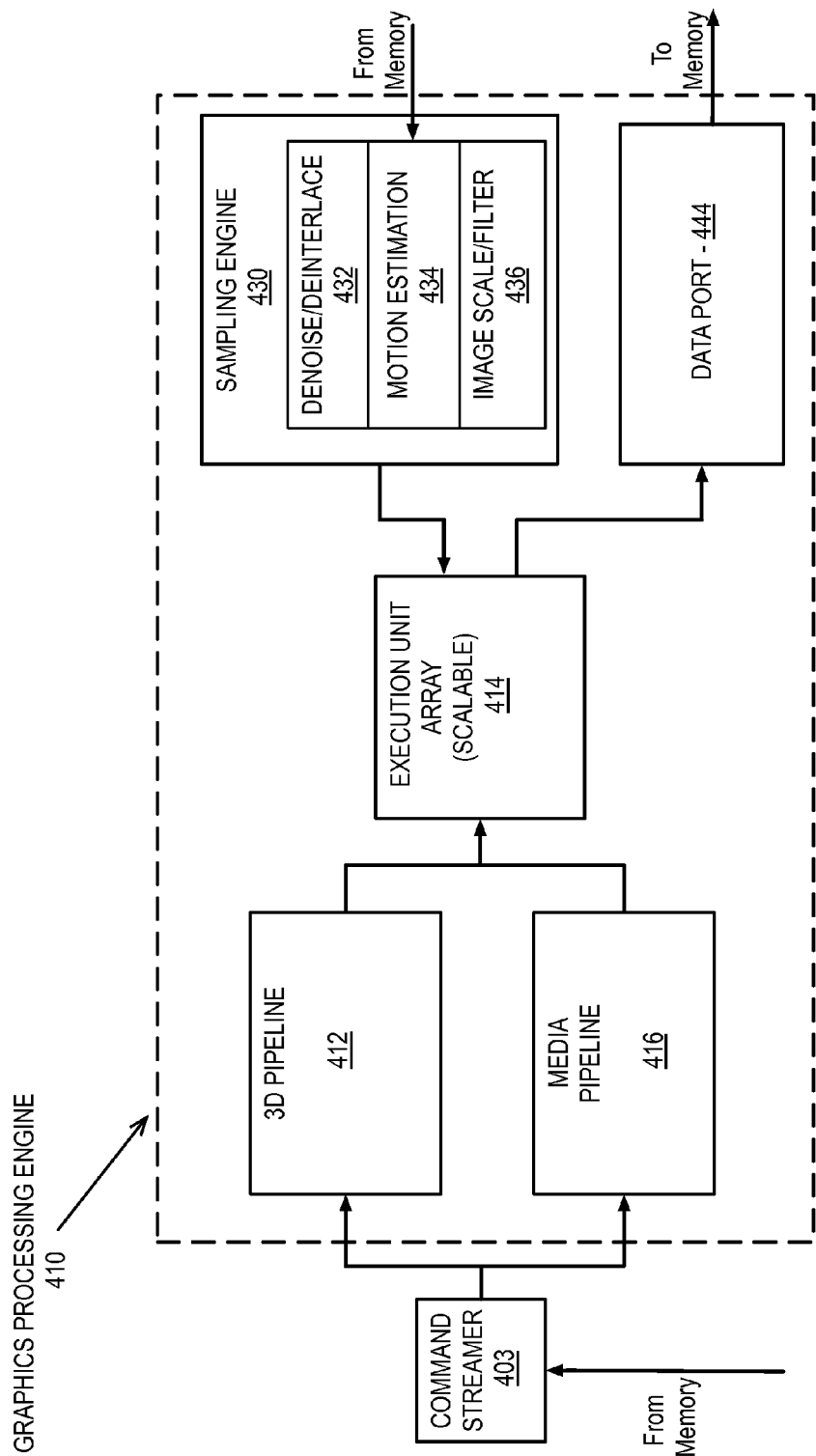
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GP E 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GP E 410.

Execution Units

Figure 5:
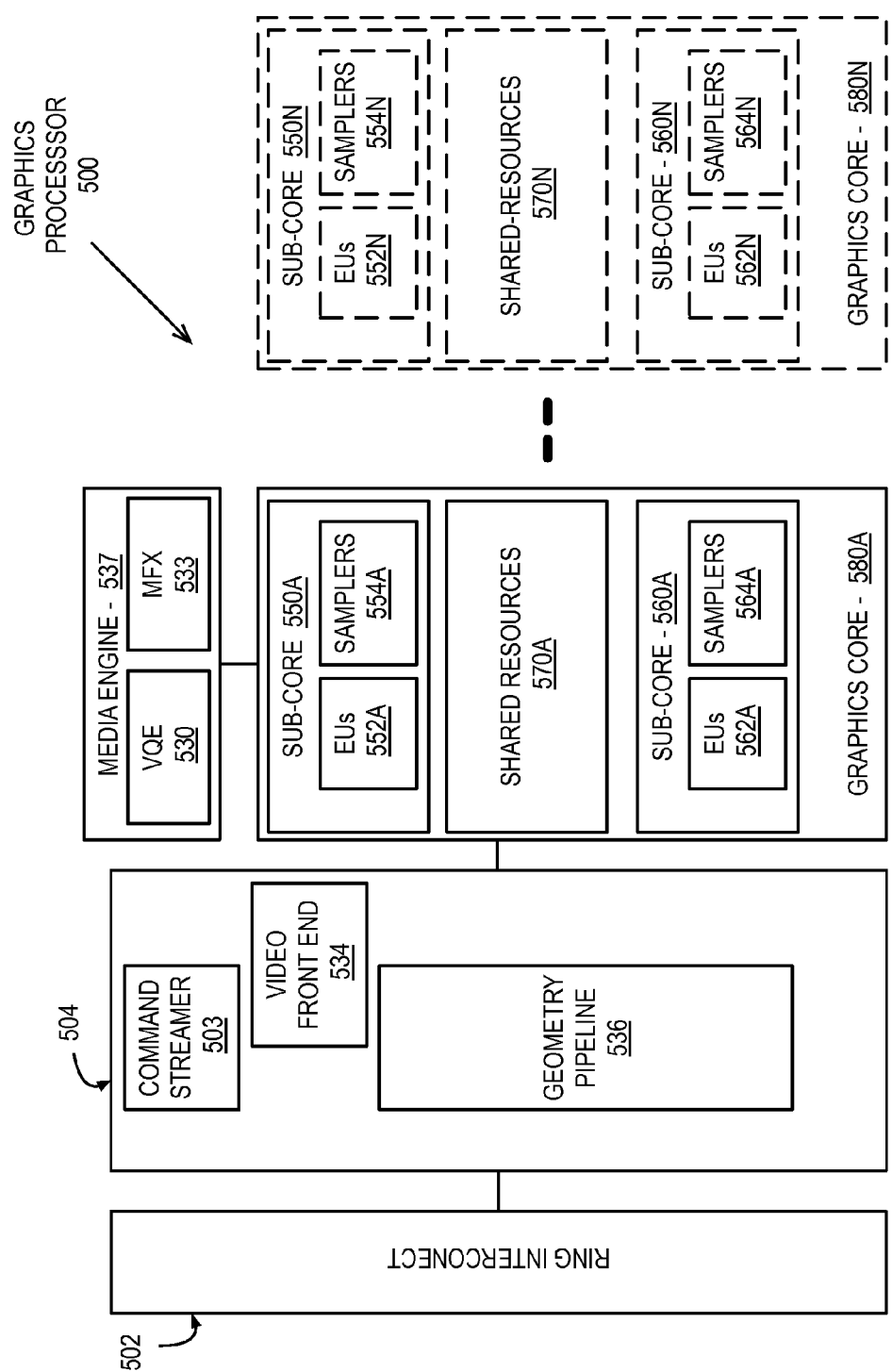
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
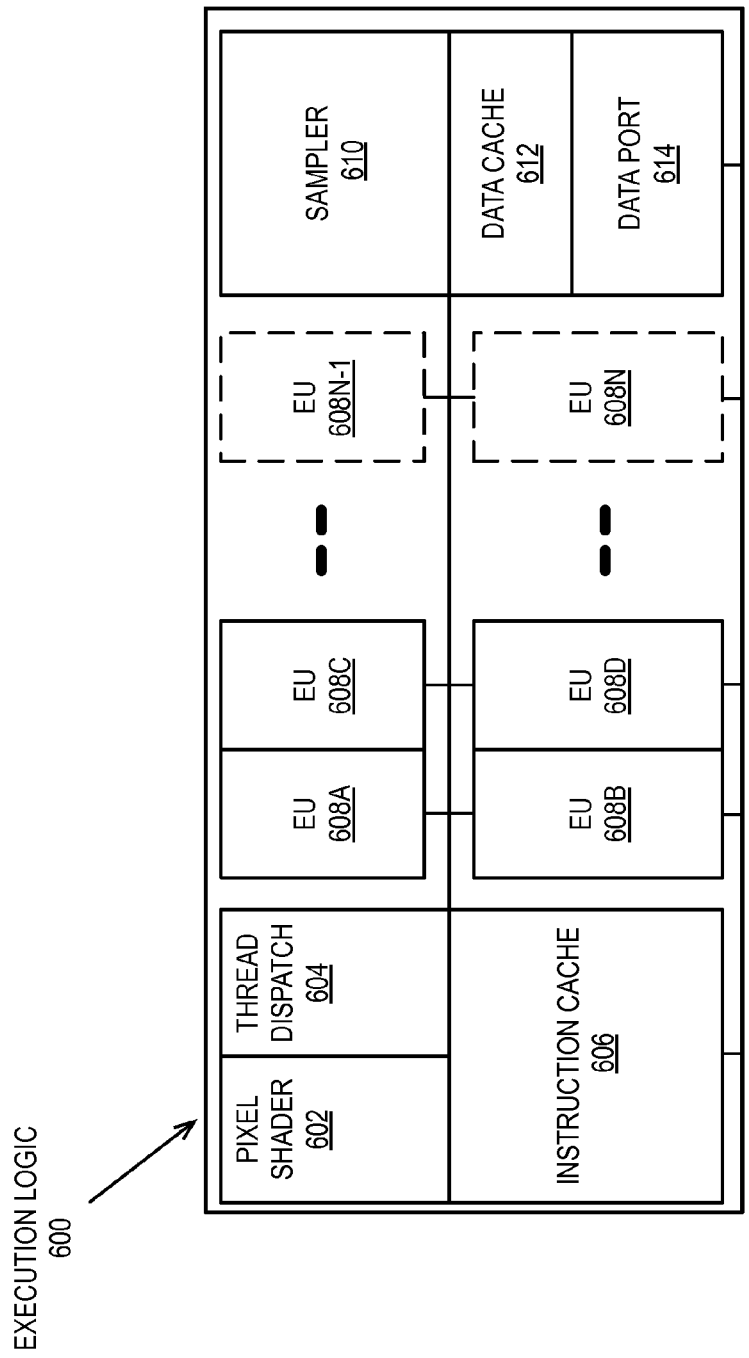
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
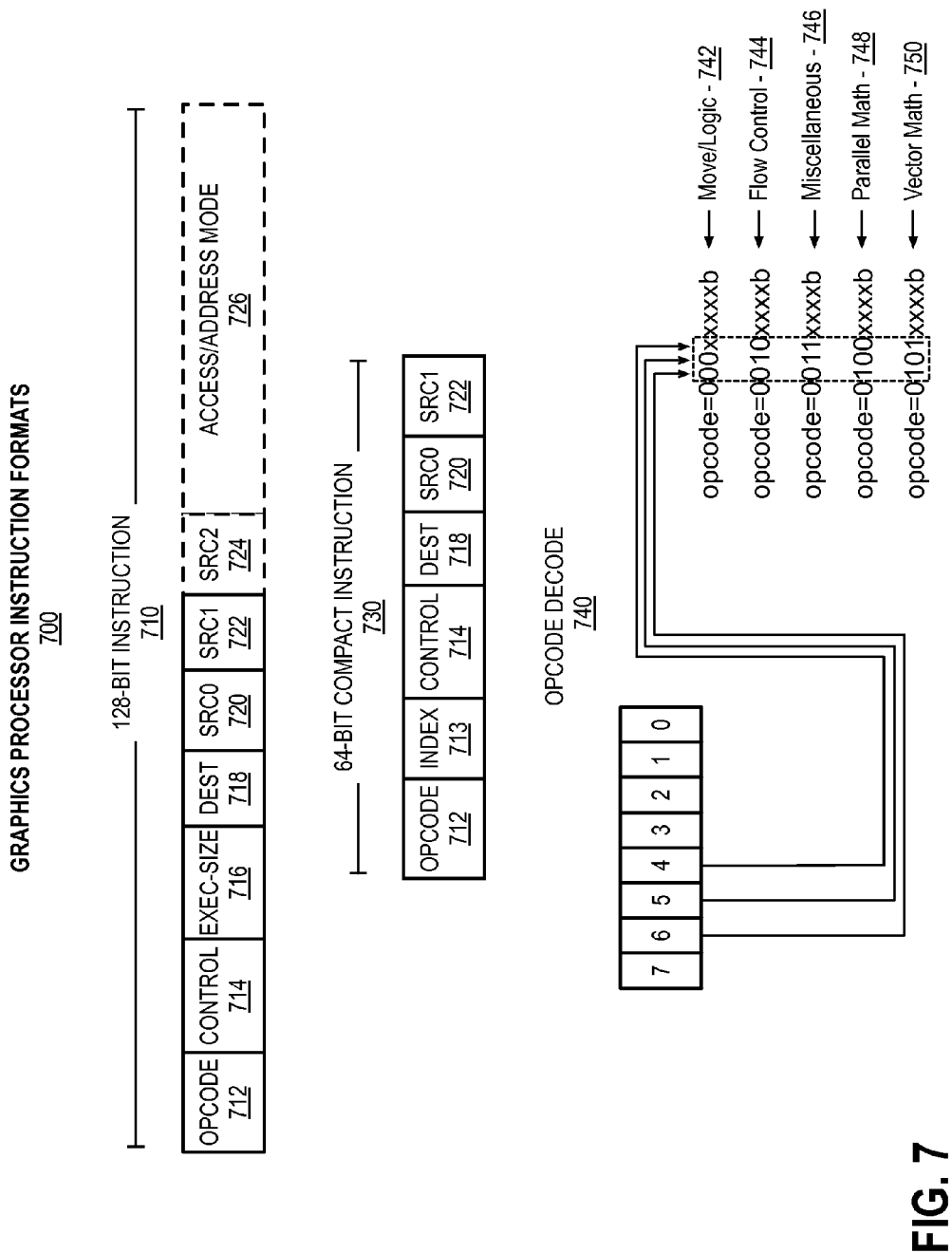
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
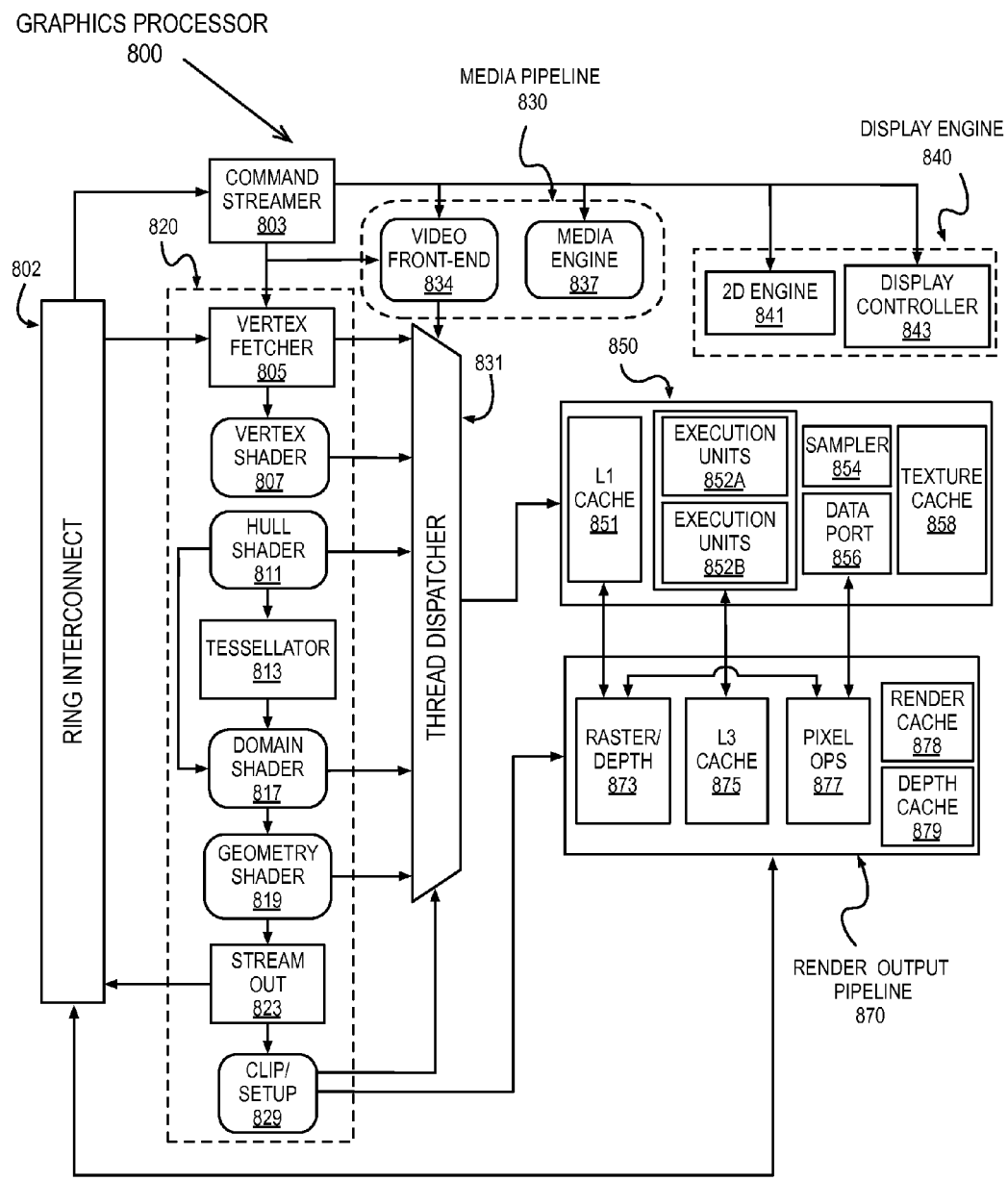
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
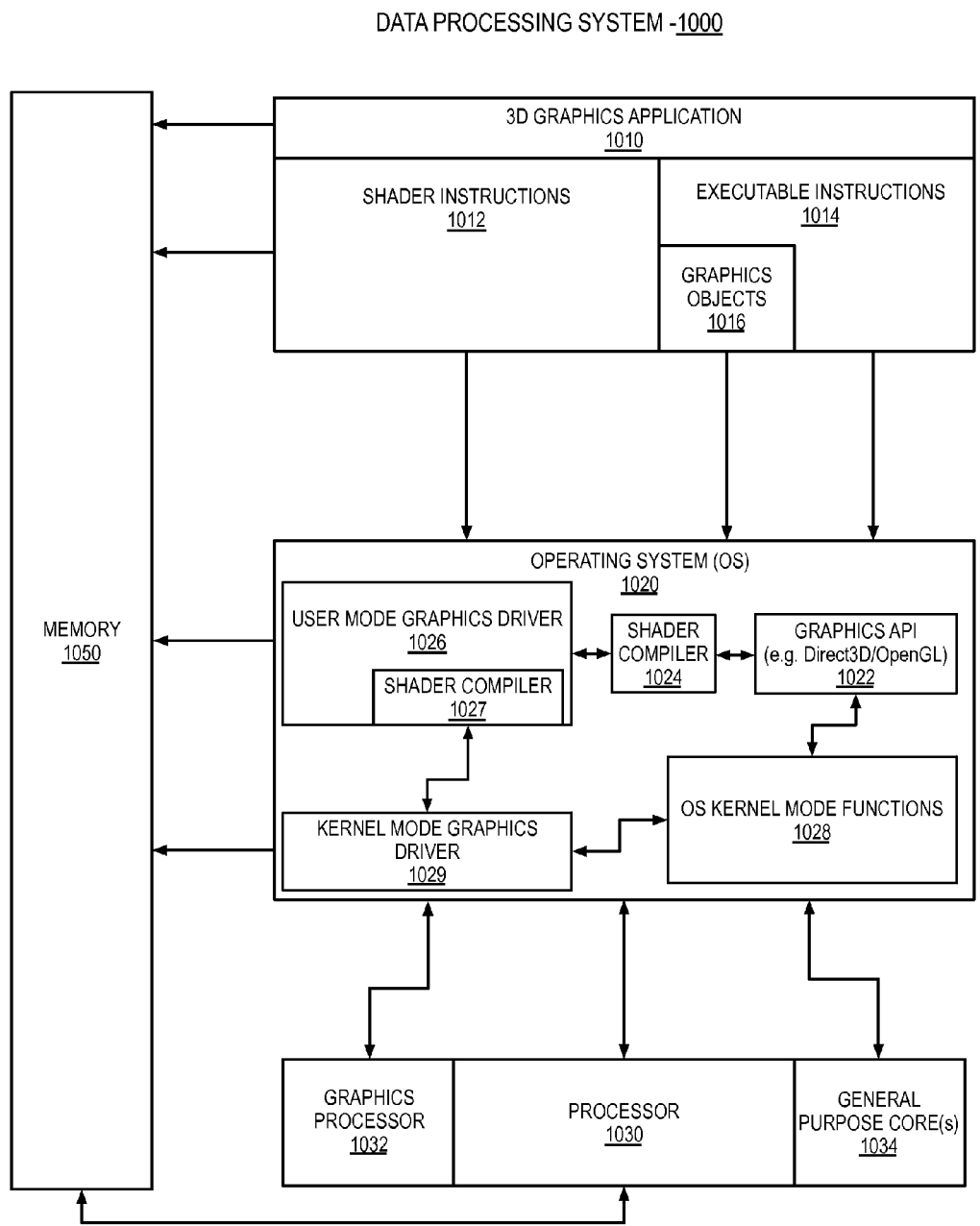
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
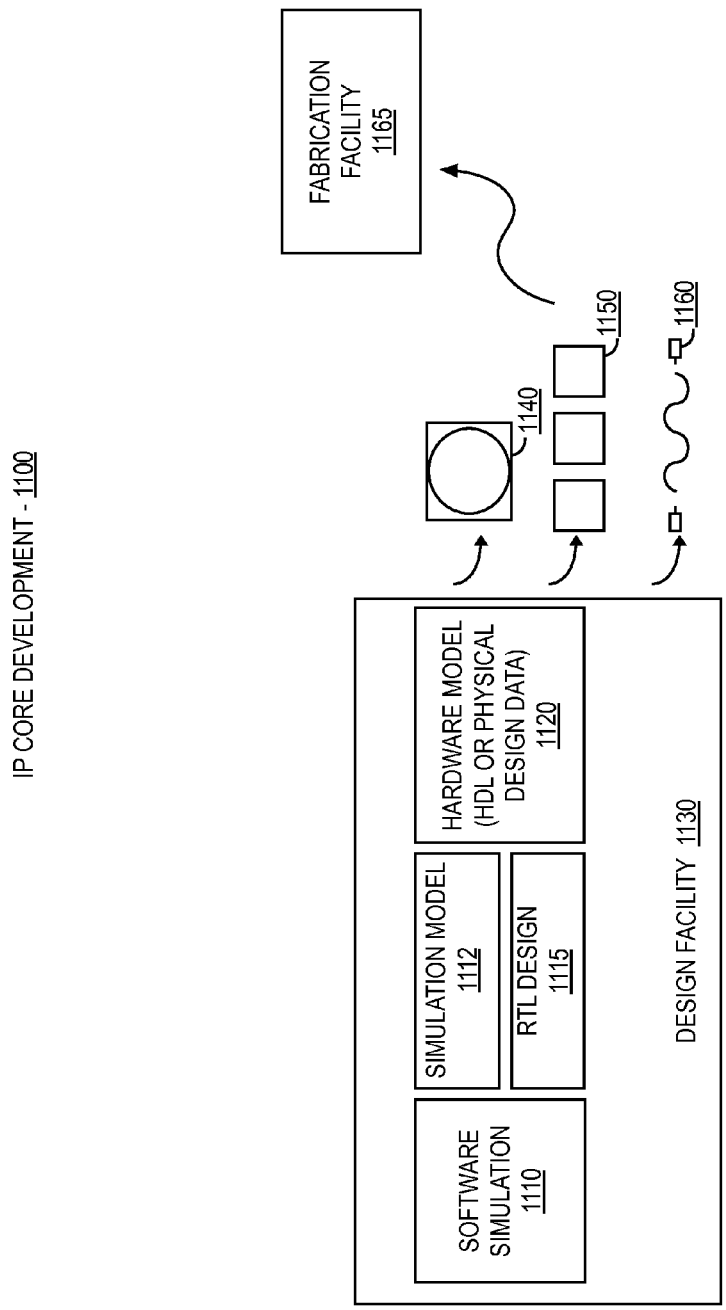
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
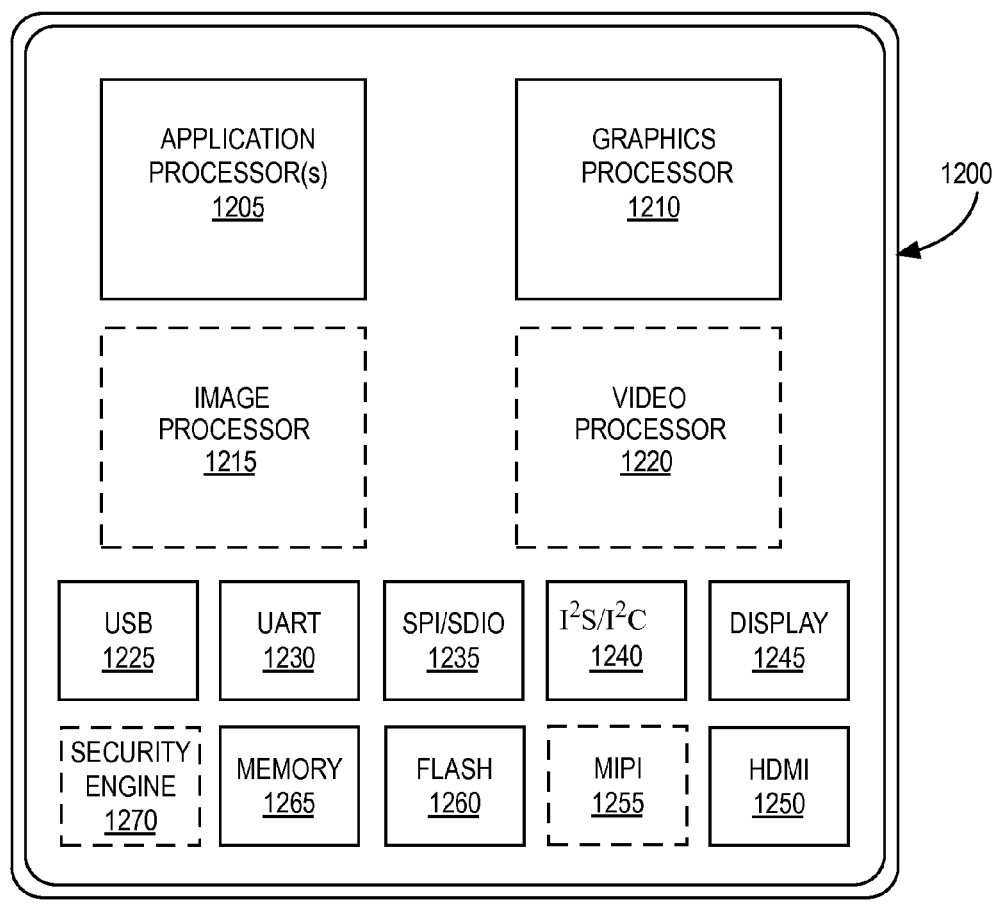
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Compiler Optimization to Reduce the Control Flow Divergence

A single instruction multiple data (SIMD) architecture operates on multiple data elements in parallel. A typical SIMD machine has N data storage elements that can be processed simultaneously. By processing N data storage elements in parallel, the computational throughput is improved N times over a single data machine. The speed advantage is even more significant when a number of complex functions can be generated in parallel utilizing the SIMD architecture.

However, the efficiency of processors utilizing SIMD architecture can be reduced in circumstances in which the control flow of the instructions becomes divergent. Control flow divergence can occur when the potential control flow for a set of instructions includes multiple, mutually exclusive control flow paths. In one embodiment, execution of the divergent branches can be performed using predication logic. Predication is an architectural feature that removes branches by converting a control dependency to a data dependency, and can be used for conditional execution. When predication is implemented, the execution and retirement of an instruction is conditional and based on the predicate value held in a separate predicate register.

However, the set of instructions that are not committed to output registers results in an under-utilization of the SIMD architecture, as at least a portion of the instructions executed will not be committed to output registers. To enhance SIMD utilization, embodiments described herein provides for compiler optimizations to automatically modify shader code at compile time to lessen the reduction in computational efficiency caused by shader unit instructions having divergent control flow. To properly detail the aspects of the optimizations described herein, a more detailed view of a graphics processor execution unit and graphics processor core is provided by FIGS. 13-14.

Figure 13:
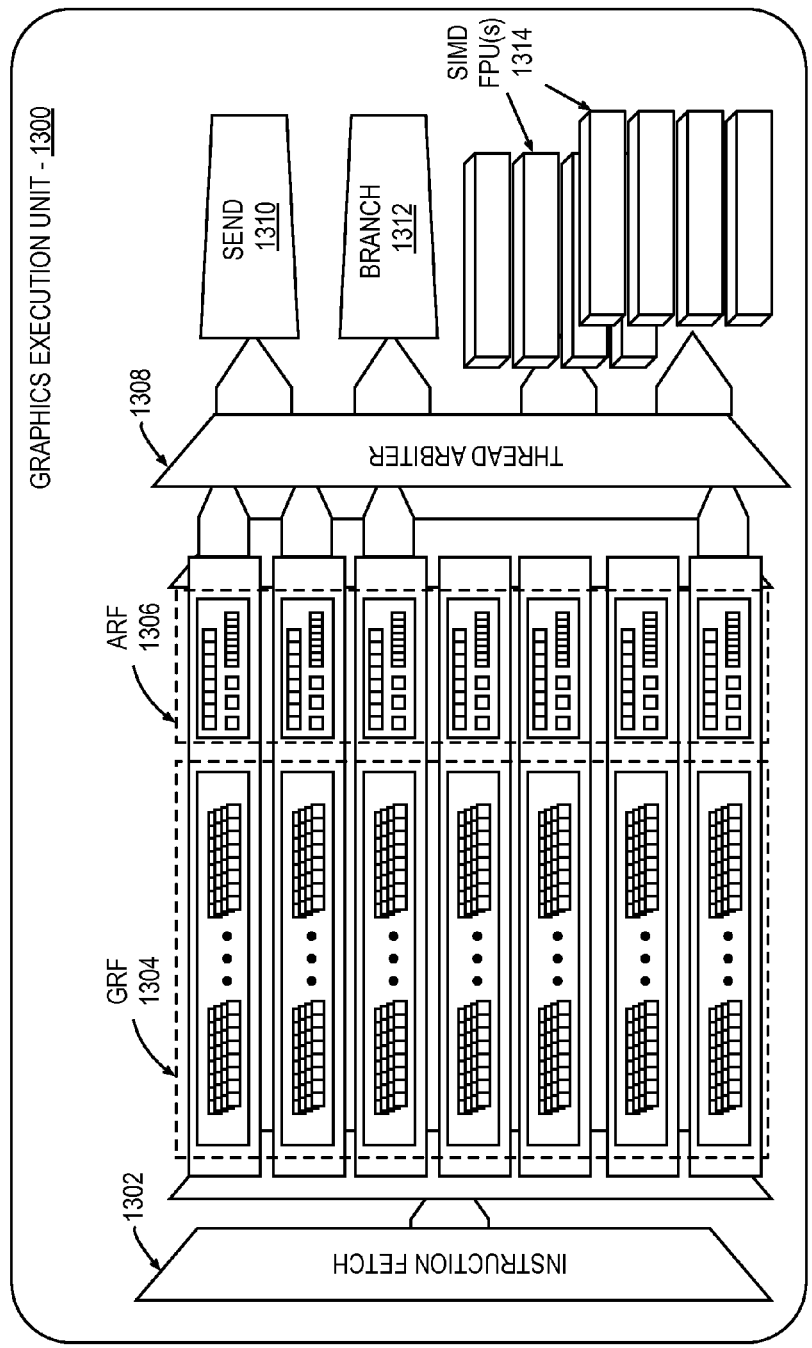
FIG. 13 is a detailed block diagram of thread execution logic within a graphics processor, according to an embodiment.

FIG. 13 is a detailed block diagram of thread execution logic within a graphics processor, according to an embodiment. In one embodiment the thread execution logic of the graphics processor is included within a graphics execution unit 1300. Multiple graphics execution units 1300 can be included within each graphics processor or graphics processor core. In one embodiment, the graphics execution unit 1300 includes an instruction fetch unit 1302, a general register file array (GRF) 1304, an architectural register file array (ARF) 1306, a thread arbiter 1308, a send unit 1310, a branch unit 1312, and a set of SIMD floating point units (FPUs) 1314. The GRF 1304 and ARF 1306 includes the set of general register files and architecture register files associated with each simultaneous hardware thread that may be active in the graphics execution unit 1300. In one embodiment, per thread architectural state is maintained in the ARF 1306, while data used during thread execution is stored in the GRF 1304. The execution state of each thread, including the instruction pointers for each thread, can be held in thread-specific registers in the ARF 1306.

In one embodiment the graphics execution unit 1300 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 1300 can co-issue up to four instructions, which may each be different instructions. The thread arbiter 1308 of the graphics execution unit thread 1300 can dispatch the instructions to one of the send 1310, branch 1312, or SIMD FPU(s) 1314 for execution. Each execution thread can access 128 general-purpose registers within the GRF 1304, where each register can store 32 bytes, accessible as a SIMD 8-element vector of 32-bit data elements. In such embodiment, each execution unit thread has access to 4 Kbytes within the GRF 1304. In one embodiment up to seven threads can execute simultaneously. In such embodiment, the GRF 1304 can store a total of 28 Kbytes. Flexible addressing modes can permit registers to be addressed together to build effectively wider registers, or even to represent strided rectangular block data structures.

In one embodiment, memory operations, sampler operations, and other longer-latency system communications are dispatched via "send" instructions that are executed by the message passing send unit 1310. In one embodiment, branch instructions are dispatched to a dedicated branch unit 1312 to facilitate SIMD divergence and eventual convergence.

In one embodiment the graphics execution unit 1300 includes one or more SIMD floating point units (FPU(s)) 1314 to perform floating-point operations. In one embodiment, the FPU(s) 1314 also support integer computation. In one embodiment the FPU(s) 1314 can SIMD execute up to four 32-bit floating-point (or integer) operations, or SIMD execute up to eight 16-bit integer or 16-bit floating-point operations. In one embodiment, at least one of the FPU(s) provides extended math capability to support high-throughput transcendental math functions and double precision 64-bit floating-point.

In one embodiment, arrays of multiple instances of the graphics execution unit 1300 can be instantiated in a graphics sub-core grouping (e.g., a sub-slice). For scalability, product architects can chose the exact number of execution units per sub-core grouping. Exemplary graphics sub-cores are illustrated in FIG. 5, which is discussed above.

Figure 14:
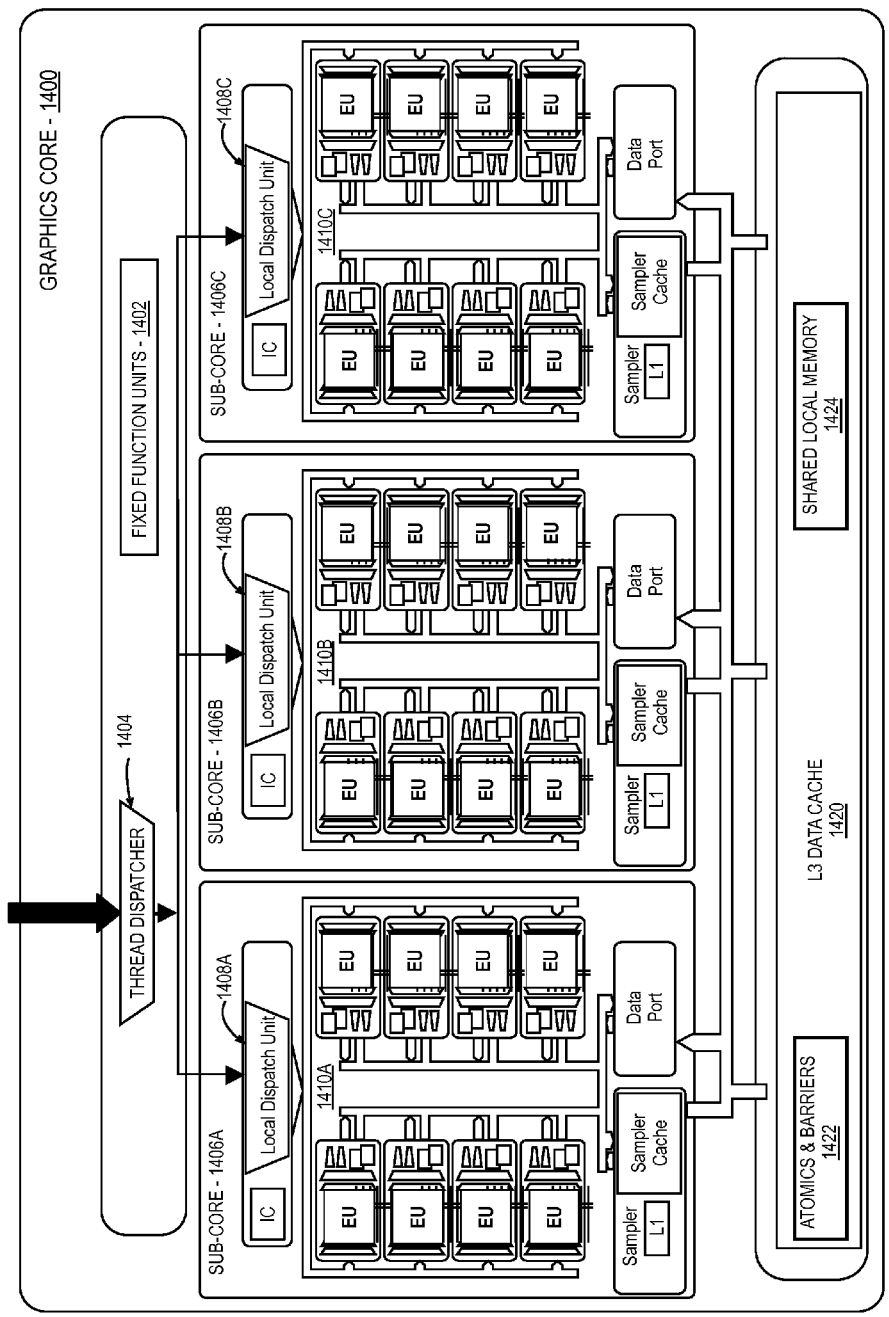
FIG. 14 is a detailed block diagram of graphic core logic, according to an embodiment.

FIG. 14 is a detailed block diagram of graphic core logic, according to an embodiment. In one embodiment the graphics core 1400 (e.g., slice) includes a cluster of sub-cores 1406A-C, which may be variants of the sub-cores 550A-N. In one embodiment the graphics core includes a set of fixed function units 1402, for example, to support media and two-dimensional graphics functionality. For programmable graphics and computational processing, a thread dispatcher 1404 can dispatch execution threads to the various sub-cores 1406A-C, where a local dispatch unit 1408A-C dispatches execution threads to the execution unit groups 1410A-C in each of the sub-cores 1406A-C. The number of execution units in each of the groups 1410A-C can vary among embodiments. Execution units within each group 1410A-C can also be dynamically enabled or disabled based on workload, power, or thermal conditions.

In one embodiment, a level-3 (L3) data cache 1420 is shared between each of the sub-cores 1406A-C. In one embodiment the L3 data cache 1420 additionally includes an atomics & barriers unit 1422 and shared local memory 1424. In one embodiment the atomics & barriers unit 1422 includes dedicated logic to support implementation of barriers across groups of threads. The atomics & barriers unit 1422 is available as a hardware alternative to pure compiler based barrier implementation. Additionally, the atomics & barriers unit 1422 enables a suite of atomic read-modify-write memory operations to the L3 data cache 1420 or to the shared local memory 1424. Atomic operations to global memory can be supported via the L3 data cache 1420.

In one embodiment, the shared local memory 1424 supports programmer managed data for sharing amongst hardware threads, with access latency similar to the access latency to the L3 data cache 1420. In one embodiment, the shared local memory 1424 sharing is limited to between threads within the same sub-core 1406A-C, however, not all embodiments share such limitation. Constructs such as the local memory space in OpenCL or DirectX Compute Shader shared memory space can be shared across a single work-group (e.g., thread-group). For software kernel instances that use shared local memory, driver runtimes typically map all instances within a given OpenCL work-group (or a DirectX11 thread-group) to execution unit thread within a sub-core 1406A-C. Accordingly, all kernel instances within a work-group can share access to the same partition within the shared local memory 1424. In such embodiment, an application's accesses to shared local memory can scale with the number of sub-cores 1406A-C.

In one embodiment, shader programs are executed using a single program multiple data (SPMD) programming model. Using SPMD, a developer can author a graphics or compute shader as if the program were to operate on a single data element (e.g., a pixel or sample for a pixel shader, for example). The underlying hardware and runtime system can then execute multiple invocations of the program in parallel with different inputs (e.g., the values for different pixels or samples).

Compiler Optimization Logic

Figure 15:
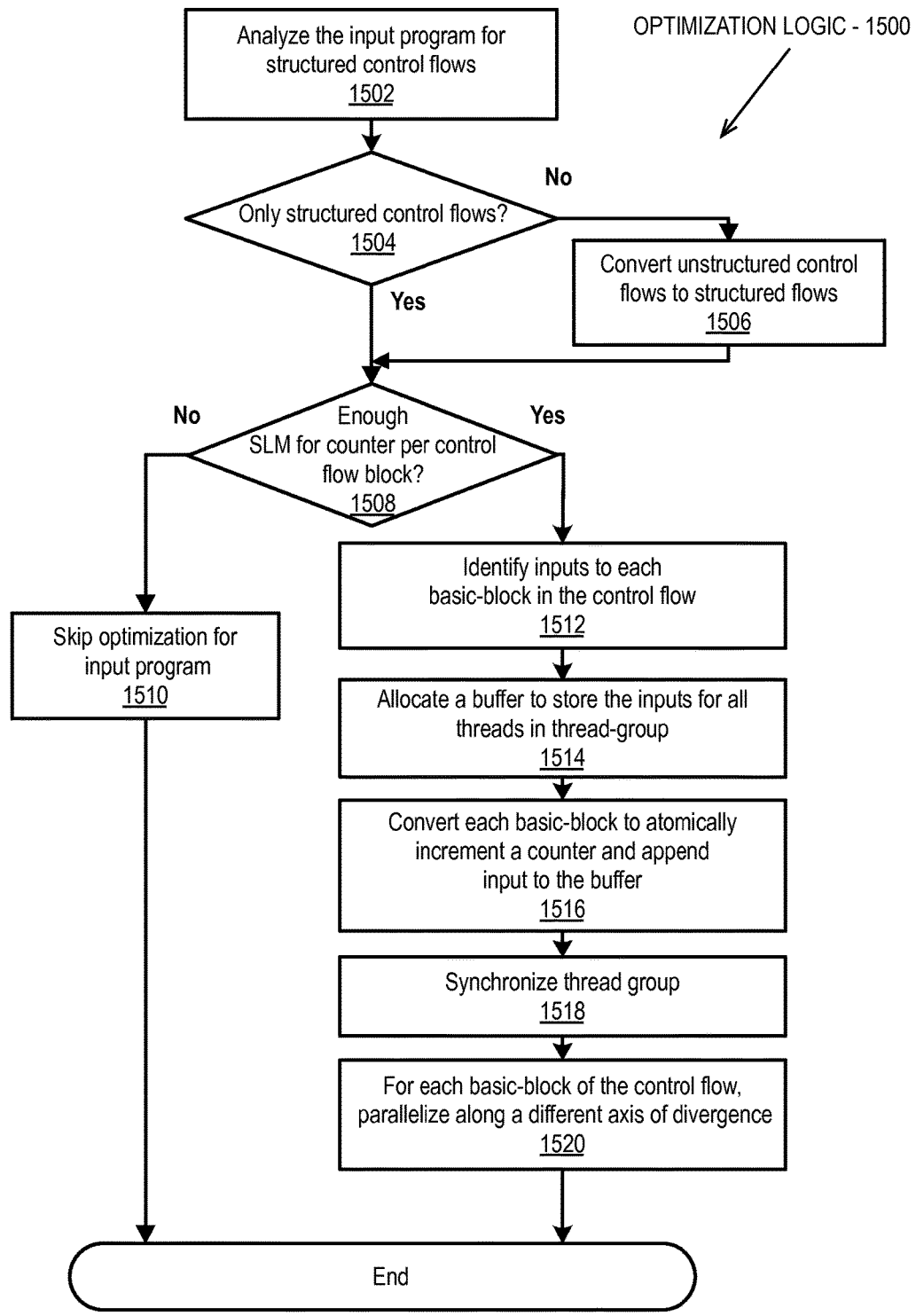
FIG. 15 is a flow diagram of optimization logic to reduce the control flow divergence, according to an embodiment.

FIG. 15 is a flow diagram of optimization logic 1500 to reduce the control flow divergence, according to an embodiment. The optimization logic 1500 can be performed at compile time on SPMD shader code to reduce the control flow divergence among work-groups or thread groups. In one embodiment the optimization logic 1500 performs operations including to analyze the input program (e.g., shader program for structured control flows, as shown at block 1502. At block 1504 the optimization logic 1500 determines if only structured control flows exist. Structured control flow is a control flow sequence with a single entry and a single exit, such as an if-then-else control flow block. Unstructured control flow can have multiple entries or exits, such as control flow via a goto or break. If any unstructured control flows are included in the input program, the optimization logic 1500 can convert the unstructured control flows into structured control flows at block 1506.

The optimization logic 1500 can then determine at block 1508 if sufficient space exists in the shared local memory (SLM) (e.g., shared local memory 1424 of FIG. 14) for a counter per control flow block. If sufficient shared local memory does not exist for a counter per control block, as determined at block 1508, the optimization logic 1500 can skip the optimization for the input program at block 1510 and end logic operations.

If sufficient shared local memory exists, the optimization logic 1500 can proceed to block 1512 and identify inputs to each block (e.g., basic-block) in the control flow for the input program. Subsequently, the optimization logic 1500 can allocate a buffer to store the inputs for all threads in the thread-group at block 1514. At block 1516 the optimization logic 1500 can convert each basic-block in the input program to atomically increment a counter and append input to the buffer allocated at block 1514. In one embodiment, the counter is atomically incremented using the atomics & barriers unit 1422 of FIG. 14. At block 1518, the optimization logic 1500 can insert an instruction to synchronize the thread group (e.g., GroupSync( ) etc.). Once the thread group is synchronized at block 1518, the optimization logic 1500 can, for each basic-block of the control flow, parallelize along a different axis of parallelism, as shown at block 1520. Parallelizing along a different axis of parallelism for each basic-block indicates that divergent code flows are executed serially in parallel by the SIMD logic such that no divergence occurs within individual basic-blocks.

An example of compute shader pseudo-code including control-flow divergence is shown in Table 1 below.

TABLE 1

Exemplary Compute Shader

```
[numthreads(N, N, 1)]
void TileCS  (uint3 groupId: SV_GroupID,
             uint3 dispatchThreadId : SV_DispatchThreadID,
             uint3 groupThreadId : SV_GroupThreadID,
             uint groupIndex : SV_GroupIndex)
{
    uint x = groupId.x, y = groupId.y;
    bool isPerSampleShading = SomeFunc(x, y);
    if (isPerSampleShading)
       PerSampleWork(..InputPerSampleWork...);
    else
       PerPixelWork(...InputPerPixelWork...);
}
```

The above shader can be launched with N×N threads in a single compute shader group where one thread corresponds to one pixel. The shader first checks whether the computations need to be performed at a sample frequency or a pixel frequency using a function SomeFunc( ... ). Depending on the results, the shader either performs the calculations per sample using the function PerSampleFunc( ... ) or per pixel using PerPixelFunc( ... ). PerSampleFunc( ... ) accepts inputs that are denoted as a set $Input_{PerSampleFunc}$ and PerPixelFunc( ... ) accepts inputs that are denoted as $Input_{PerPixelFunc}$. If the test isPerSampleShading is evaluated to be different along the contiguous Compute Shader threads, then the underlying SIMD hardware will have low SIMD utilization because it will execute both the code paths (e.g., PerSampleFunc( ) and PerPixelFunc( )), for example, using predication. During the execution of each code path, a sub-optimal number of SIMD elements will be utilized.

In one embodiment, compiler optimizations provided by embodiments described herein can re-arrange and re-order shader code at compile time to reduce the control flow divergence within the code and re-arrange the code such that all threads in the thread-group perform same, potentially computationally heavy code in parallel or otherwise wait a synchronization point.

In one embodiment, SIMD divergence can be reduced by identifying the elements in each divergent grouping and processing the divergent groupings individually. Once all threads that are associated with a specific basic control-flow block are identified, the inputs consumed by the specific basic control-flow block can be pushed into an append buffer. In one embodiment, the inputs can be compressed using a lossless compression algorithm before the inputs are pushed into the append buffer. In one embodiment, one append buffer per basic block is used. If sufficient memory exists in the shared local memory, the optimization logic can store the append buffer for each basic block in the shared local memory. Otherwise, the append buffer can be stored, or can 'spill' into a higher level of the memory hierarchy (e.g., embedded DRAM or main memory). However, in one embodiment, as illustrated at block 1508 of FIG. 15 the counter variables used to index into the append buffers are stored in shared local memory, as the counter variables are accessed atomically by each thread. Storing the counter variables in shared local memory improves the access times of the counters by an order of magnitude, as atomic access to the counter variables can be accelerated by the atomics & barriers unit 1422 illustrated in FIG. 14.

In one embodiment optimization logic, during compilation, can optimize the exemplary compute shader of Table 1. A compiler generated optimization of the exemplary compute shader is shown in Tables 2-4 below.

TABLE 2

Optimized Compute Shader pt.1.

```
groupshared uint sNumPerSample, sNumPerPixel;
groupShared uint sPerSamplePixels [N*N], sPerPixelPixels[N*N];
[numthreads(N, N, 1)],
void TileCS(uint3 groupId: SV_GroupID,
            uint3 dispatchThreadId : SV_DispatchThreadID,
            uint3 groupThreadId : SV_GroupThreadID,
uint groupIndex : SV_GroupIndex)
{
    if (groupindex == 0) {
        sNumPerSample = sNumPerPixel = 0;
    }
    sPerSamplePixels[groupIndex] = 0;
    sPerPixelPixels[groupIndex] = 0;
    GroupMemoryBarrierWithGroupSync( );
    ...
```

Table 2 shows an initial portion of an exemplary optimized shader having divergent control flow. Table 2 shows logic to configure the thread groupings for the compute shader. Once the thread groupings are configured, a barrier instruction (e.g. GroupMemoryBarrierWithGroupSync( ) is executed by all threads to synchronize the thread operations. In one embodiment, the atomics & barriers unit 1422 of FIG. 14 can be used to execute the barrier instruction.

In one embodiment, the control flow divergence of the shader of Table 1 is optimized by performing the divergent operations as low workload instructions that determine a set of inputs for each divergent code path. Exemplary optimized compute shader pseudo code is shown in Table 3 below.

TABLE 3

Optimized Compute Shader pt.2.

```
uint x = groupId.x, y = groupId.y;
bool isPerSampleShading = SomeFunc(x, y);
if (isPerSampleShading) {
    // Create a list of pixels that need per-sample shading
    uint listIndex;
    InterlockedAdd(sNumPerSample, 1, listIndex);
    sPerSamplePixels[listIndex] = Pack (..InputPerSampleWork...);
} else {
    // Create a list of pixels that need per-sample shading
    uint listIndex;
    InterlockedAdd(sNumPerPixel, 1, listIndex);
    sPerPixelPixels [listIndex] = Pack((..InputPerPixelWork...);
}
```

As shown in Table 3, the portion of the shader that includes control flow divergence is configured to append items to an allocated buffer (e.g., an append buffer), which in one embodiment, is stored in shared local memory. Each basic control-flow block of the divergent portion of the compute shader is converted to atomically increment a counter and append input for the control flow block into the append buffer. For example, the PerSampleShading and PerPixelShading control blocks are configured to atomically increment a counter for the number of per-sample and per-pixel inputs, then pack inputs for the control blocks into append buffers for each control block.

Once the append buffers and counters are configured, the optimized logic can configure the shader code to synchronize the thread group and, for each basic-block of the control flow perform parallel SIMD operations for each axis of parallelism, as shown in Table 4.

TABLE 4

Optimized Compute Shader pt.3.

```
GroupMemoryBarrierWithGroupSync( );
for (uint i=groupIndex; i < sNumPerSample; ++i) {
    PerSampleWork( Unpack ( ..InputPerSampleWork..) );
}
GroupMemoryBarrierWithGroupSync( );
for (uint i=groupIndex; i < sNumPerPixel; ++i) {
    PerPixelWork( Unpack ( ..InputPerPixelWork..) );
}
```

As shown in Table 4, the optimization logic can configure the shader code to synchronize the thread group via a barrier instruction (e.g., GroupMemoryBarrierWithGroupSync) and perform SIMD operations on each of the previously divergent groups independently. The code of Table 4 includes the code that was originally sensitive to divergent code flow, but has been converted to a non-divergent code flow. Each thread of the group works on the similar code.

Under some circumstances, certain assumptions are made when performing the illustrated optimization. For example, the optimization assumes that sufficient shared local memory exists to store thread input. In some circumstances, if sufficient shared local memory does not exist to store thread input, the append buffers may be spilled to a higher level of memory. Using a higher level of the memory hierarchy may result in higher access latency for the append buffers. However, if the originally diverge control flow includes computationally heavy instructions an overall performance improvement may be realized. The use of compile time optimization may be particularly advantageous for shader code that is too complex for programmer hand optimization, for example, nested control flows.

In one embodiment, the optimizations described herein are performed automatically for shader code having divergent control flow. For example, a static-analysis pass can be performed on the shader code before compilation to flag portions of the code having a divergent control flow. In one embodiment, a programmer can indicate portions of shader code to optimize, for example, via hints to the shader compiler. In such embodiment, for example, for the high level shader language (HLSL), a [divergent] hint can be added to indicate to the shader compiler to optimize structured sections of the shader code with a divergent control flow. In one embodiment, the compiler can be configured to optimize all unstructured control flows for shader code having unstructured control flows (e.g., do-while, jump, break, etc.), where the optimization includes converting unstructured control flows into structured control flows.

Figure 16:
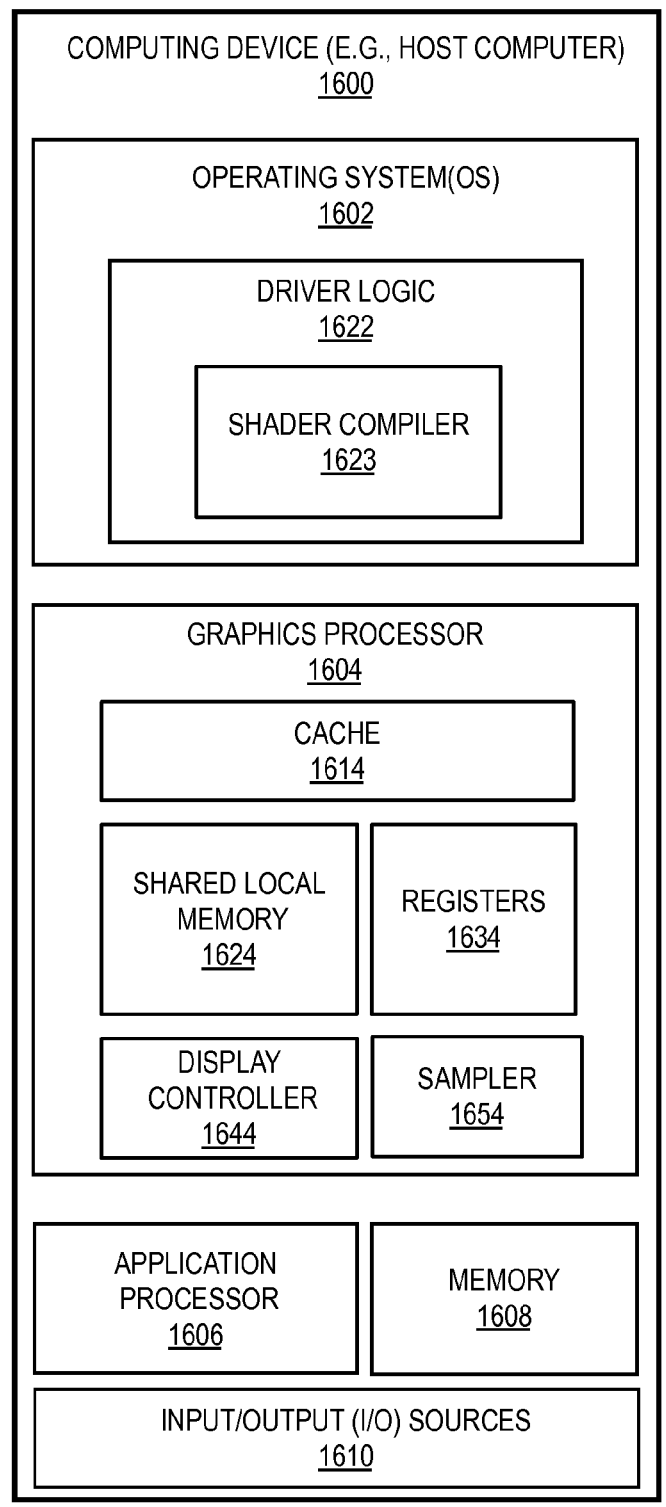
FIG. 16 is a block diagram of a computing device configured to perform compiler optimizations to reduce the control flow divergence, according to an embodiment.

FIG. 16 is a block diagram of a computing device 1600 configured to perform compiler optimizations to reduce the control flow divergence, according to an embodiment. Computing device 1600 (e.g., mobile computing device, desktop computer, etc.) may be the same as data processing system 100 of FIG. 1 and accordingly, for brevity and ease of understanding, many of the details stated above with reference to FIG. 1-10 are not further discussed or repeated hereafter.

Computing device 1600 may include a mobile computing device (e.g., smartphone, tablet computer, laptops, game consoles, portable workstations, etc.) serving as a host machine for a graphics processor 1604 having cache memory 1614 and shared local memory 1624. The shared local memory 1624 can be the shared local memory 1424 of FIG. 14 that is used to store data for compiler based optimizations of graphics and compute shader code having control flow divergence. In one embodiment the cache 1614 is the L3 data cache 1420 of FIG. 14. In one embodiment, in addition to an L3 cache, the cache memory 1614 can be an additional level of the memory hierarchy, such as a last level cache stored in the embedded memory module 218 of FIG. 2.

The computing device 1600 may include any number and type of communication devices, such as large computing systems, such as server computers, desktop computers, etc., and may further include set-top boxes (e.g., Internet-based cable television set-top boxes, etc.), global positioning system (GPS)-based devices, etc. The computing device 1600 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1600 includes a mobile computing device employing an integrated circuit ("IC"), such as system on a chip ("SoC" or "SOC"), integrating various hardware and/or software components of computing device 1600 on a single chip.

In one embodiment, the graphics processor 1604 includes a display controller 1644 and a sampler 1654, each configured to sample from and display framebuffer or other render target memory. In one embodiment, the display controller 1644 is a variant of the display controller 302 of FIG. 3 and/or the display engine 840 of FIG. 4. The sampler 1654, in one embodiment, is a variant of the sampler 854 of FIG. 8.

As illustrated, in one embodiment, in addition to a graphics processor 1604 employing, the computing device 1600 may further include any number and type of hardware components and/or software components, such as (but not limited to) an application processor 1606, memory 1608, and input/output (I/O) sources 1610. The application processor 1606 can interact with a hardware graphics pipeline, as illustrated with reference to FIG. 3, to share graphics pipelining functionality. Processed data is stored in a buffer in the hardware graphics pipeline, and state information is stored in memory 1608. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

The application processor 1606 can include one or processors, such as processor(s) 102 of FIG. 1, and may be the central processing unit (CPU) that is used at least in part to execute an operating system (OS) 1602 for the computing device 1600. The OS 1602 can serve as an interface between hardware and/or physical resources of the computer device 1600 and a user. The OS 1602 can include driver logic 1622 including the user mode graphics driver 1026 and/or kernel mode graphics driver 1029 of FIG. 10. The driver logic 1622 can have additional shader compiler logic 1623 (e.g., a shader compiler unit) including optimizations to reduce the performance reduction of divergent control-flows within graphics or compute shaders having SIMD or SPMD logic. The shader compiler logic 1623 can be a version of the shader compiler 1024 and/or shader compiler 1027 of FIG. 10.

It is contemplated that in some embodiments, the graphics processor 1604 may exist as part of the application processor 1606 (such as part of a physical CPU package) in which case, at least a portion of the memory 1608 may be shared by the application processor 1606 and graphics processor 1604, although at least a portion of the memory 1608 may be exclusive to the graphics processor 1604, or the graphics processor 1604 may have a separate store of memory. The memory 1608 may comprise a pre-allocated region of a buffer (e.g., framebuffer); however, it should be understood by one of ordinary skill in the art that the embodiments are not so limited, and that any memory accessible to the lower graphics pipeline may be used. The memory 1608 may include various forms of random access memory (RAM) (e.g., SDRAM, SRAM, etc.) comprising an application that makes use of the graphics processor 1604 to render a desktop or 3D graphics scene. A memory controller hub, such as memory controller hub 116 of FIG. 1, may access data in the RAM and forward it to graphics processor 1604 for graphics pipeline processing. The memory 1608 may be made available to other components within the computing device 1600. For example, any data (e.g., input graphics data) received from various I/O sources 1610 of the computing device 1600 can be temporarily queued into memory 1608 prior to their being operated upon by one or more processor(s) (e.g., application processor 1606) in the implementation of a software program or application. Similarly, data that a software program determines should be sent from the computing device 1600 to an outside entity through one of the computing system interfaces, or stored into an internal storage element, is often temporarily queued in memory 1608 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 1610 may include one or more I/O devices that are implemented for transferring data to and/or from the computing device 1600 (e.g., a networking adapter); or, for a large-scale non-volatile storage within the computing device 1600 (e.g., hard disk drive). User input devices, including alphanumeric and other keys, may be used to communicate information and command selections to graphics processor 1604. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 1600 may be employed to observe gestures, record audio and video and to receive and transmit visual and audio commands.

I/O sources 1610 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/ or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1600 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a graphics processing system comprising a graphics processor having execution logic and shared memory; a shader compiler unit to compile a shader program for execution by the execution logic of the graphic processor, the shader compiler further to optimize the shader program during the compile, wherein to optimize the shader program includes to convert a divergent block of parallel instructions into a divergent block and a non-divergent block of instructions. In a further embodiment, the shader program is a single program multiple data (SPMD) shader program and the shader compiler unit is to configure the non-divergent block of instructions to be performed by single instruction multiple data (SIMD) logic of the execution logic in the graphics processor. In one embodiment, the shader compiler unit is to configure the divergent block of instructions to identify inputs to each basic-block of control flow.

One embodiment provides for a system in which the shader compiler unit is to further to configure the non-divergent block of instructions to allocate a buffer to store the inputs for threads in a thread group and append inputs for the threads to the buffer. In one embodiment, the instructions of the shader program are to allocate the buffer to store the inputs for the threads in shared memory of the graphics processor. In one embodiment the shader compiler unit is to further to convert instructions of the shader program to atomically increment a separate counter for each input for the basic-block of the control flow, allocate the counters for each input in shared memory of the graphics processor, and configure thread groups to synchronize after executing a basic-block of instructions having a divergent control flow. One embodiment provides for a system in which the shader compiler is to configure instructions of the shader program to parallelize each axis of parallelism within a non-divergent block of instructions using the buffer having the inputs for the threads in the thread group and the atomically incremented counter.

One embodiment provides for a data processing system comprising a shader compiler unit to configure instructions of a shader program to identify inputs for instructions in each block of control flow for the shader program, the shader program including instructions having a divergent control flow, and allocate a buffer to store inputs for threads in a thread group of the shader program, wherein the shader compiler is further to convert instructions for each block of control flow to atomically increment a counter for each input of a block of instructions having a divergent control flow block and synchronize shader thread groups associated with each block; and a graphics processor to execute the shader program, wherein the shader program is to cause the graphics processor to execute instructions for the shader program in parallel, without control flow divergence, for each different axis of parallelism. In one embodiment the shader program is a single program multiple data (SPMD) shader program and the graphics processor is to execute the SPMD shader program using single instruction multiple data (SIMD) logic.

Various components can be a means for performing the operations or functions described. Each component described herein includes software, hardware, or a combination of these. The components can be implemented as software modules, hardware modules, special-purpose hardware (e.g., application specific hardware, application specific integrated circuits (ASICs), DSPs, etc.), embedded controllers, hardwired circuitry, etc. Besides what is described herein, various modifications can be made to the disclosed embodiments and implementations without departing from their scope. Those skilled in the art will appreciate from the foregoing description that the broad techniques of the embodiments can be implemented in a variety of forms.

Therefore, the illustrations and examples herein should be construed in an illustrative, and not a restrictive sense. The scope and spirit of the invention should be measured solely by reference to the claims that follow.

What is claimed is:

1. A graphics processing system comprising:
a graphics processor execution logic and shared memory;
a shader compiler unit to compile a shader program for execution by a single instruction multiple data (SIMD) logic of the execution logic of the graphic processor, the shader compiler further to optimize the shader program during the compile, wherein to optimize the shader program at compile time includes to determine if any unstructured control flow having multiple entries or exits exists within the shader program and to convert any unstructured control flow including a divergent control flow block of parallel instructions into a divergent control flow block and a non-divergent control flow block of instructions to enhance utilization of the SIMD logic of the execution logic, wherein the shader compiler is to further optimize by parallelizing along different axis of parallelism for each block of the control flow to indicate that divergent code flows are executed serially in parallel by single instruction multiple data (SIMD) logic such that no divergence occurs within each block of the control flow, wherein divergence for the control flow is defined as including multiple, mutually exclusive control flow paths.

2. The system as in claim 1, wherein the shader program is a single program multiple data (SPMD) shader program and the shader compiler unit is to configure the non-divergent block of instructions to be performed by single instruction multiple data (SIMD) logic of the execution logic in the graphics processor.

3. The system as in claim 1, wherein the shader compiler unit is to configure the divergent block of instructions to identify inputs to each block of control flow.

4. The system as in claim 3, wherein the shader compiler unit is to further to configure the non-divergent block of instructions to allocate a buffer to store the inputs for threads in a thread group and append inputs for the threads to the buffer.

5. The system as in claim 4, wherein the instructions of the shader program are to allocate the buffer to store the inputs for the threads in shared memory of the graphics processor.

6. The system as in claim 4, wherein the shader compiler unit is to further to convert instructions of the shader program to atomically increment a separate counter for each input for the block of the control flow.

7. The system as in claim 6, wherein the shader compiler unit is to further to allocate the counters for each input in shared memory of the graphics processor.

8. The system as in claim 6, wherein the shader compiler unit is to configure the thread groups to synchronize after executing a block of instructions having a divergent control flow.

9. The system as in claim 6, wherein the shader compiler is to configure instructions of the shader program to parallelize each axis of parallelism within a non-divergent block of instructions using the buffer having the inputs for the threads in the thread group and the atomically incremented counter.

10. A computer-implemented method at a graphics processing system, the method comprising:
identifying inputs for instructions in each block of control flow for a shader program;
allocating a buffer to store inputs for threads in a thread group of the shader program;
convert instructions for each block of the control flow to atomically increment a counter for each input of the block;
synchronize the shader thread groups associated with each block; and
parallelize along different axis of parallelism for each block of the control flow to indicate that divergent code flows are executed in parallel by single instruction multiple data (SIMD) logic such that no divergence occurs within each block of the control flow, wherein divergence for the control flow is defined as including multiple, mutually exclusive control flow paths.

11. The method as in claim 10, further comprising allocating the buffer to store the inputs for the threads in shared memory of a graphics processor in the graphics processing system.

12. The method as in claim 10, further comprising allocating the counter to count the inputs for the threads in shared memory of a graphics processor in the graphics processing system.

13. The method as in claim 10, further comprising analyzing the shader program for structured control flows.

14. The method as in claim 13, further comprising determining whether the shader program includes an unstructured control flow having multiple entries or exits and converting the unstructured control flow to a structured control flow having a single entry and a single exit.

15. A non-transitory computer-readable storage medium storing instructions which, when executed by one or more processors, cause the one or more processors to perform operations comprising:
identifying inputs for instructions in each block of control flow for a shader program;
allocating a buffer to store inputs for threads in a thread group of the shader program;
convert instructions for each block of the control flow to atomically increment a counter for each input of the block;
synchronize the shader thread groups associated with each block; and for each block of the control flow, parallelize along a different axis of parallelism to indicate that divergent code flows are executed in parallel by single instruction multiple data (SIMD) logic such that no divergence occurs within each block of the control flow, wherein divergence for the control flow is defined as including multiple, mutually exclusive control flow paths.

16. The medium as in claim 15, further comprising instructions to perform operations including allocating the buffer to store the inputs for the threads in shared memory of a graphics processor.

17. The medium as in claim 15, further comprising instructions to perform operations including allocating the counter to count the inputs for the threads in shared memory of a graphics processor.

18. The medium as in claim 15, further comprising instructions to perform operations including analyzing the shader program for structured control flows.

19. The medium as in claim 18, further comprising instructions to perform operations including determining whether the shader program includes an unstructured control flow having multiple entries or exits and converting the unstructured control flow to a structured control flow having a single entry and a single exit.

20. The medium as in claim 15, further comprising instructions to perform operations including determining if sufficient free shared memory exists to allocate a counter for each block of the control flow and bypassing optimization of the shader program based on the determination.

* * * * *